(12) United States Patent
Mankame et al.

(10) Patent No.: US 8,032,238 B2
(45) Date of Patent: Oct. 4, 2011

(54) MECHANICAL SYSTEM WITH AN ACTIVE MATERIALS-BASED ACTUATOR

(75) Inventors: Nilesh D. Mankame, Ann Arbor, MI (US); Alan L. Browne, Grosse Pointe, MI (US); Paul W. Alexander, Ypsilanti, MI (US); Nancy L. Johnson, Northville, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 693 days.

(21) Appl. No.: 12/130,227

(22) Filed: May 30, 2008

(65) Prior Publication Data

US 2009/0299502 A1      Dec. 3, 2009

(51) Int. Cl.
*G06F 19/00*   (2011.01)
(52) U.S. Cl. ............... 700/62; 700/56; 700/60; 700/61
(58) Field of Classification Search ............ 700/56, 700/60, 61, 62
See application file for complete search history.

(56) References Cited

U.S. PATENT DOCUMENTS

| | | | |
|---|---|---|---|
| 4,103,710 A * | 8/1978 | Labit et al. ............... | 137/624.13 |
| 5,511,979 A * | 4/1996 | Perfect et al. ............. | 434/58 |
| 6,830,141 B1 | 12/2004 | Neelakantan et al. | |
| 7,021,055 B2 * | 4/2006 | Gummin et al. ............. | 60/527 |
| 7,126,674 B2 * | 10/2006 | Butler ................... | 355/72 |
| 7,352,149 B2 * | 4/2008 | Butler et al. ............. | 318/649 |
| 7,598,652 B2 * | 10/2009 | Kornbluh et al. ........... | 310/309 |
| 7,635,057 B2 * | 12/2009 | Gierer et al. ............. | 192/85.63 |
| 7,681,474 B2 * | 3/2010 | Weldon et al. ............. | 74/512 |
| 2004/0067134 A1 * | 4/2004 | Beauchamp et al. .......... | 416/37 |
| 2006/0289266 A1 * | 12/2006 | Gierer et al. ............. | 192/85 R |
| 2007/0102962 A1 * | 5/2007 | Alexander et al. .......... | 296/187.01 |

* cited by examiner

*Primary Examiner* — Michael D Masinick
(74) *Attorney, Agent, or Firm* — Quinn Law Group, PLLC (57) ABSTRACT

A mechanical system selectively imparts a prescribed motion to an output load using two or more actuators, including at least one having an active material element. The output load can be a locking member when the system is a vehicle transmission, a shuttle car of a linear system, or another device. A controller determines a total motive force required for imparting the prescribed motion, and selectively commands a combination of the actuators to provide the total motive force, apportioning the total motive force between the various actuators to optimize the performance of the system. An algorithm determines which combination of the actuators is the most suitable in moving the output load, and continuously modified this combination as needed as the output load is moved. The other actuator or actuators are then selectively energized as needed to provide the total motive force depending on this suitability determination.

15 Claims, 4 Drawing Sheets

MECHANICAL SYSTEM WITH AN ACTIVE MATERIALS-BASED ACTUATOR

TECHNICAL FIELD

The present invention relates to a mechanical system adapted for moving an output load by apportioning a total motive force between multiple actuators, at least one of which is constructed of an active material.

BACKGROUND OF THE INVENTION

In a mechanical system, pressurized fluid, electricity, or another source of energy may be used to impart a motive force to an output load, with the motive force being capable of moving the output load over a predetermined distance. Various rotary or linear actuator devices or actuators, such as motors, valves, and/or movable pistons or levers, can direct the motive force as needed in a precise manner within the mechanical system in order to achieve a desired end result.

In a multi-positional mechanical system, variations in environmental conditions such as temperature, as well as the physical properties or characteristics of the output load, can affect the overall performance or response of the system. The use of a conventional actuator of increased size may be used to compensate for such factors, but may be less than optimal, due in part to the added weight, increased packaging size, and/or increased energy requirements of operating a larger or more energy consuming actuator.

SUMMARY OF THE INVENTION

Accordingly, a mechanical system uses two or more actuators, at least one of which includes an active material element or component, for selectively imparting a prescribed motion to an output load. As used herein, "prescribed motion" refers to a distance of travel, time required for the motion, acceleration and deceleration time history, extent of overshoot, etc. In addition to the actuators, the system includes one or more energy sources, with the same or different energy sources used for powering the actuators as needed, and a controller operable for calculating or determining a total motive force required for moving the output load over the predetermined distance. The controller selectively commands a suitable combination of the actuators as needed in order to provide the total motive force, apportioning the total motive force between the various actuators to optimize the performance of the system, such as by optimizing or improving system efficiency, speed, precision of motion, etc.

Using an algorithm, the controller determines which of the various actuators or combination thereof is most suitable for imparting the desired motion to the output load, and then activates this actuator or actuators as the output load is moved. The actuators are selectively energized as needed to provide the total motive force depending on this sufficiency determination. In one embodiment, a sensor is used to measure system characteristics for determining the required total motive force. A sensor can also be used to determine various system characteristics, such as a condition or state of the actuators, as well as a condition of the operating environment and/or the output load, for making the sufficiency determination. The actuators can be configured as rotary devices or as linear actuators. In another embodiment, the active materials are shape memory alloys (SMA) or electro-active polymers (EAP), although the invention is not intended to be limited to these particular embodiments or materials.

A method is also provided for imparting a desired motion to an output load from a first position to a second position in a mechanical system. The method includes detecting a signal requesting a desired motion of the output load, and determining a total motive force necessary for imparting the desired motion. The method then includes determining which of a plurality of actuators or combination thereof is most suitable for imparting the motion within a time limit, i.e., a threshold or calibrated period of time, and then activating the combination. The method further includes selectively actuating any remaining actuators by commanding a portion of the total motive force from each actuator as needed. At least one of the actuators has an active element with a variable property, which can be varied by applying a stimulus. In one embodiment, the output load is a locking member and the mechanical system is configured as a vehicle transmission, although the output load can be configured in other ways, and for other purposes, within the scope of the invention.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
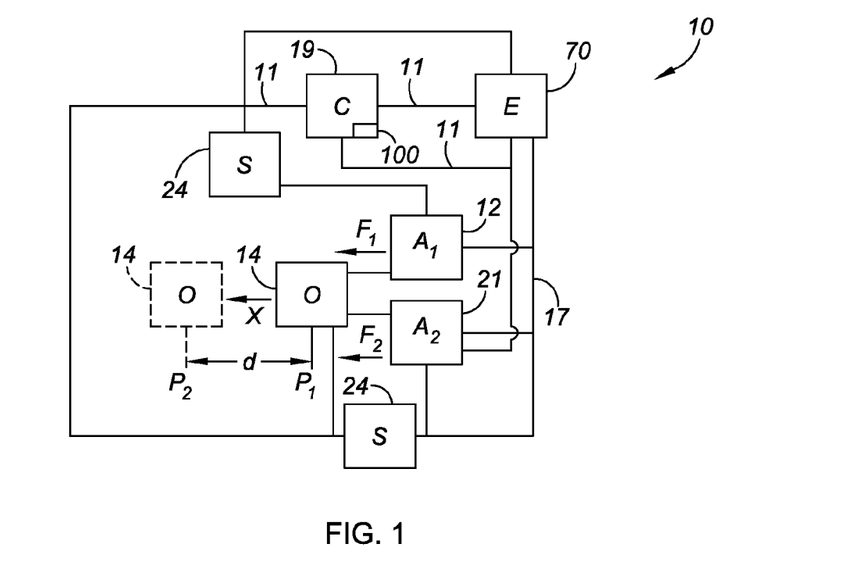
FIG. 1 is a schematic illustration of a mechanical system according to the invention.

Referring to the drawings wherein like reference numbers correspond to like or similar components throughout the several figures, and beginning with FIG. 1, a mechanical system 10 includes a first actuator 12, abbreviated $A_1$, and a second actuator 21, abbreviated $A_2$. The actuators 12, 21 are defined herein as any device operable for exerting or applying an actuation or motive force $F_1$ and $F_2$, respectively, to a coupled output load (O) 14 in order to provide a total motive force sufficient for imparting a desired motion to the output load 14, for example to move the output load 14 through a predetermined distance "d", or between respective first and second positions $P_1$ and $P_2$ in a specified time period or interval. As used herein, the term "motive force" refers to a force sufficient for producing a desired motion, including but not limited to a distance traveled by the output load 14, a time in which the output load 14 travels, and any acceleration or deceleration profile of the output load 14. The actuators 12, 21 can be configured as rotary actuators, such as an electrical motor, or as linear actuators in order to provide the desired direction to the movement of the output load 14, such as in the direction of arrow X in FIG. 1, as will be described below.

An electronic control unit or controller 19 (C) is in communication with each of the actuators 12, 21 via a control path 11, for example a conductive wire, a length of fiber optic cable, and/or a wireless or radio frequency (RF) control link. The controller 19 is also in communication with one or more energy sources (E) 70, such as a vehicle battery, a fuel cell, or another ready supply of energy for activating or powering the actuators 12, 21 via a conductor 17. Alternately, the energy source 70 can be multiple or separate energy sources, such as an electrical energy source for energizing or activating the actuator 21 and a fluid power source for energizing or activating the actuator 12. The controller 19 further includes a method or algorithm 100 adapted for selectively energizing or activating the actuators 12, 21 as needed to generate a total motive force sufficient for imparting the desired motion to the output load 14 over the distance d in response to a signal, command, or other condition as detected or sensed by one or more sensors (S) 24.

The actuator 12 is configured as a conventional mechanical, hydraulic, electrical, or electromechanical device, and is selectively stimulated or energized by the energy source 70 to thereby produce the motive force $F_1$. The motive force $F_1$ is a variable force sufficient for moving the output load 14 over some or all of the required distance d. The actuator 21 includes an "active element", i.e., is constructed at least partially of an active material such as a shaped memory alloy (SMA) or other active or "smart" material, as will described in greater detail hereinbelow. The actuator 21 can be selectively activated or energized by the controller 19 to provide a motive force $F_2$ if needed, whether supplementary or primary to the motive force $F_1$. That is, the motive force $F_2$ might be a supplementary force if the motive force $F_1$ from the actuator 12 is determined by the controller 19 to be insufficient for providing the total motive force necessary for providing or imparting a desired motion to the output load 14. Likewise, the motive force $F_2$ might be a primary force if the controller 19 determines the actuator 21 to be capable of providing the desired motion to the output load 14 more suitably, with the controller 19 selectively actuating the actuator 12 if the motive force $F_1$ from the actuator 12 is at any point determined to be insufficient for providing the total motive force. As used herein, the term "suitable" refers to a determination of one or more of relative efficiency, response speed, stroke, force, cost, expected life, operating condition, or other criteria of one of the actuators 12, 21 with respect to the other. The algorithm 100 then determines which actuator 12 or 21, or combination thereof, is most suitable for imparting the desired motion to the output load 14.

Figure 2:
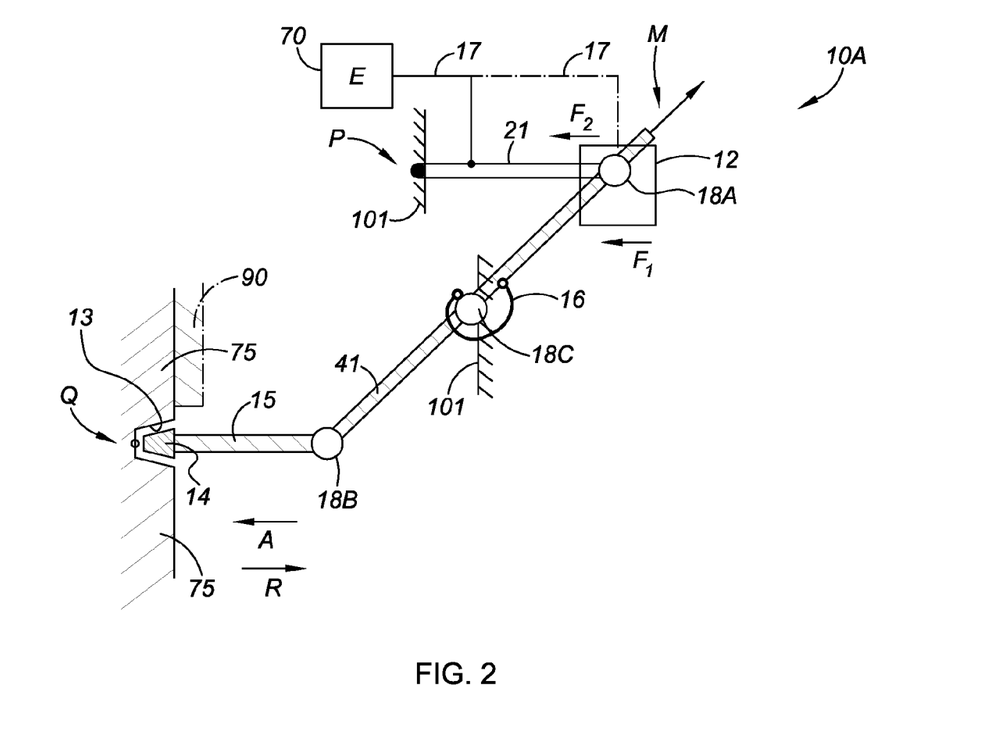
FIG. 2 is a schematic illustration of an exemplary transmission interlock system embodiment of the mechanical system of FIG. 1, with the transmission interlock system shown in a park (P) position.

Referring to FIG. 2, the system 10 of FIG. 1 is shown in an exemplary embodiment as a transmission interlock system 10A for a vehicle transmission, referred to hereinafter for simplicity collectively as the interlock system 10A. Such an interlock system 10A can be used in conjunction with a parking brake or interlock system to provide a positive restraint against motion of the vehicle (not shown) when the vehicle is parked, i.e., when a transmission equipped with such a mechanical interlock system is set in a park or "P" position. Likewise, the interlock system may be selectively disengaged whenever the transmission is placed in an out-of-park or "OP" position. Such an interlock system therefore ensures that any motion of a vehicle so equipped is enabled only when the transmission is set in or shifted to an out-of-park (OP) position. However, although an interlock system 10A is shown in FIG. 2, the motion enabled by the system 10 of FIG. 1 may also be used to move or position other multi-positional systems or devices within the scope of the invention, such as for example a vehicle suspension or height adjustment system. The interlock system 10A is thus operable for use within a vehicle transmission, not shown in its entirety, but portions of which are shown as the output load 14 and a transmission member 75 that is coupled with one or more wheels (not shown) of the vehicle.

The interlock system 10A shown in FIG. 2 appears as it would when set to a first position or a park (P) position. A shift selector (not shown) positioned in the vehicle interior (not shown) may be a user-selectable lever, a switch, a button, and/or other such user-operated device, the motion of which generates or commands a signal via the controller 19 (see FIG. 1) in response to a predetermined and/or sensed or detected condition from the sensor or sensors 24 (see FIG. 1). The interlock system 10A also includes a manual override lever as indicated by the arrow M, which a user of the interlock system 10A may move to manually position the interlock system 10A into a park (P) or out-of-park (OP) position irrespective of the status of the controller 19 (see FIG. 1).

The interlock system 10A includes the actuators 12 and 21 described above. A lever or linkage 41 is operatively connected to an actuator rod 15 which is automatically or manually moveable to achieve a first or a second position or a park (P) position shown in FIG. 2 and an out-of-park (OP) position shown in FIG. 3. That is, when the park (P) position of FIG. 2 is commanded, one or both of the actuators 12 and/or 21 is de-energized, and a biasing or torsion spring 16 may be used to assist the movement of the actuator rod 15 about a pivot 18C in the direction of arrow A, thus locking an output load 14, such as a shaped locking member, into a mating feature 13, such as a notch, slot, or groove formed in the transmission member 75, to achieve the park (P) position.

Figure 3:
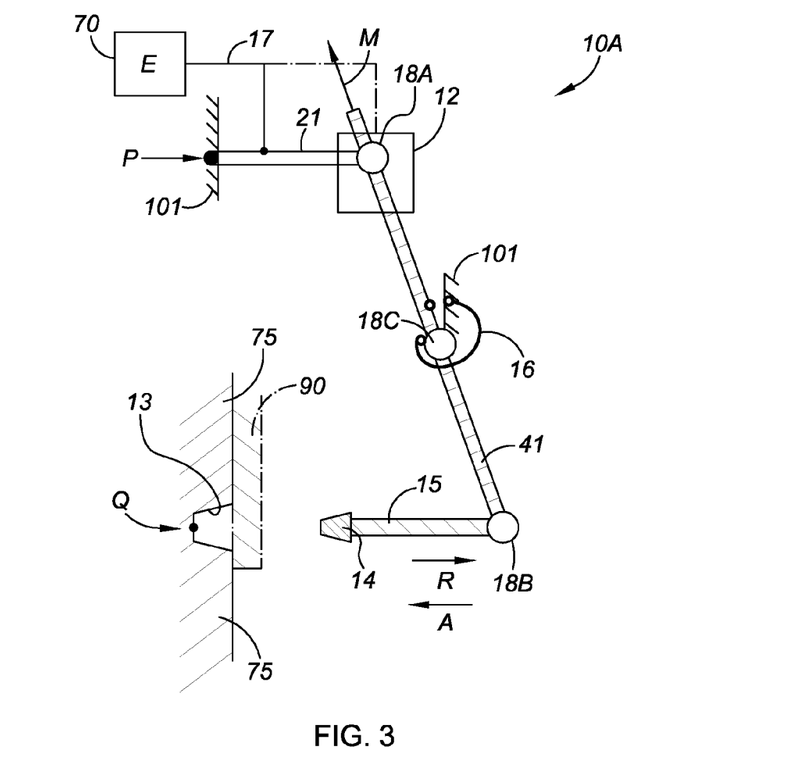
FIG. 3 is a schematic illustration of an exemplary transmission interlock system embodiment of the mechanical system of FIG. 1 as shown in an out-of-park (OP) position.

Likewise, when the out-of-park position (OP) as shown FIG. 3 is commanded or signaled, the actuator 12 and/or 21 are energized. In turn, the actuator 12 and/or 21 applies the total motive force needed to move the output load 14 in the direction of arrow R, thus setting or positioning the interlock system 10A into a second position, which is the out-of-park (OP) position shown in FIG. 3.

In the embodiment shown in FIG. 2, the actuator 21, which in one embodiment is a shaped memory alloy (SMA) wire as defined below, is fastened or connected at location or point P to a stationary member 101, such as a transmission housing portion, and at another end 18A to a linkage 41. The linkage 41 is connected between the first end 18A and a second end 18B. The actuator rod 15 is connected between the end 18B and the output load 14. The linkage 41 can be sized as needed to ensure a sufficient amount of amplification of force, motion, and/or frequency of the actuator 21 when the actuator 21 is activated or stimulated. Whatever the embodiment, the actuators 12 and 21 are selectively coupled to the output load 14, and activated as needed to move the output load 14 through the predetermined distance d in an optimally efficient manner.

Referring to FIG. 3, when the transmission is to be placed in an out-of-park (OP) position, the algorithm 100 (see FIG. 1) determines a suitable combination of actuators 12 and 21 to be used in moving the output load 14 based on inputs from one or more sensors 24 (see FIG. 1). When the actuator 21 is to be activated, the controller 19 turns off or disconnects the energy supply 70 to prevent electrical energy from flowing to one or both of the actuators 12, 21 as needed. At the same time, the controller 19 initiates a stimulus, such as heat or a voltage or current provided by the energy supply 70 in order to change a variable property of the actuator 21, such as its length. This change, which will be described below, ultimately produces the motive force $F_2$ which either augments or assists the motive force $F_1$, or acts as the majority or all of the total motive force, as determined by the controller 19 (see FIG. 1). In this manner, the response time of the interlock system 10A can be tailored to match the desired requirements by drawing on the capabilities of both actuators 12 and 21 as needed.

As used herein, and as will be understood by those of ordinary skill in the art, the term "active elements" refers generally to active material compositions having certain predetermined and variable properties, such as stiffness, shape, dimensions, and/or material morphology or structure that may be selectively modified by introducing an external stimuli or "activation signal". Stimuli may include, but are not limited to, applied electrical and/or magnetic fields, photo-chemical activation, external stresses, temperature fluctuations, moisture, and/or pH changes, or combinations thereof. For example, the voltage source 70 may be selectively connected to drive an electrical current through a conductor within or in proximity to an associated active component or element to generate the necessary heat for inducing a solid-state phase transformation, and/or to induce an electric and/or magnetic field around an active element, depending upon the application and the particular active component.

Although many active material components may be useable within the scope of the invention, a few types of active material components or active elements may be particularly useful within the interlock system 10A, such as electro-active polymers (EAP), shape memory alloys (SMA), magneto-rheological fluids, electro-rheological fluid (ERF), pseudo-plastic or shear-thinning fluids, piezoelectric materials, electro-strictive materials, and/or magneto-strictive materials.

Electro-active Polymers (EAP) include polymeric materials which respond in a particular manner to external electrical stimulation, such as an applied voltage, by a change of shape and/or size. Consequently, EAP are capable of converting electrical energy to a mechanical force and/or movement, and vice versa. EAP may be divided in two primary classes: dielectric EAP, in which actuation is caused by electrostatic forces between two electrodes which squeeze the polymer, and ionic EAP, in which actuation is caused by the conformational changes produced by the displacement of ions inside the polymer.

Shape memory alloys (SMA), which are sometimes referred to in the art informally as "smart materials", are materials or compositions exhibiting pseudo-elasticity and shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition. These capabilities are due, in part, to a temperature and stress-dependent solid-state change of phase due to a cooperative atomic rearrangement. The two phases, i.e. the Martensite (m) phase and the Austenite (a) phase, refer to the lower and higher temperature phases, respectively, in which the phase transformation occurs from a low-symmetry (Martensite) to a highly symmetric (Austenite) crystallographic structure. SMAs represent a class of thermally-activated smart materials (TASM) that undergo a reversible phase transformation responsible for stress-induced and temperature-induced recoverable deformation behavior.

Piezoelectric materials are materials, traditionally crystalline structures and ceramics, which produce a voltage when a mechanical stress is applied thereto. Since this effect also applies in the reverse manner, a voltage applied across a sample piezoelectric material will produce a mechanical stress within the sample. For example, activation of a piezoelectric material can result in a change in dimension of approximately 0.1% for piezo-ceramics and 1% for piezo-polymers. Suitably designed structures made from these materials can therefore be made that bend, expand, or contract when a voltage is applied thereto.

Active materials may also be magneto-strictive or electro-strictive. The term "magneto-strictive" refers to the mechanical deformation that occurs in a ferromagnetic material when it is placed in a magnetic field. Active materials may therefore be selected with desired magneto-strictive properties so that they may change their length in a desired fashion when subjected to an induced electromagnetic field. Likewise, electro-strictive materials may change their stiffness or strain in response to an applied voltage.

Accordingly, the actuator 21 of FIGS. 2 and 3 may be constructed partially or fully of an active material component having predetermined properties, for example a variable length or stiffness value that varies actively in response to an applied stimulus, such as resistive heating or a voltage from the energy source 70. For example, the actuator 21 may be constructed entirely of an SMA wire or coil that remains in a partially de-twinned martensitic (m) phase when the interlock system 10A is in a park (P) position as shown in FIG. 2, unless and until the actuator 21 is heated above a characteristic temperature. When the actuator 21 is heated to a temperature exceeding the characteristic temperature, a solid-state transformation occurs, and the actuator 21 enters the austenite phase or a-phase. Heating of the actuator 21 may be achieved by Joule, radiation, convection, or other suitable heating methods, and the actuator 21 thereby generates the motive force $F_2$. The motive force $F_2$ overcomes any biasing force provided by the torsion spring 16 and any friction forces between the output load 14 and the notch 13. This motion ultimately disengages the output load 14 to place the interlock system 10A in the out-of-park (OP) position shown in FIG. 3. An optional retaining mechanism 90, shown also in FIG. 2, such as a selectively positionable blocking plate, latch, or other similar device, may be provided to retain the out-of-park (OP) position of FIG. 3, so that the actuator 21 may be de-activated once the out-of-park (OP) position is attained. Likewise, when the interlock system 10A is commanded to go into the park (P) position, the retaining mechanism 90 is released and the actuators 12 and/or 21 are deactivated, and the torsion spring 16 overcomes the friction forces between the output load 14 and the notch 13 and provides the necessary force for stretching the active element 21 back to its initial or de-energized length. The actuator 12 is coupled to the output load 14 in a manner that allows the spring 16 to drive the output load 14 in a direction opposite that in which the output load 14 was originally driven by the actuator 12. Additionally, the actuators 12 and 21 are coupled to the output load 14 in such a manner as to allow either of the actuators 12 or 21 to drive the other when only one of the actuators 12 and 21 is used to moved the output load 14.

The anchoring point of the actuator 21, represented generally in FIGS. 2 and 3 as the point P, can be changed as needed to modify the force-displacement characteristics of the actuator 21 to those required at position Q, i.e., the position of the output load 14 in the embodiment of the interlock system 10A shown in FIGS. 2 and 3. As will be understood by those of ordinary skill in the art, other transmission such as gear trains, pneumatic or hydraulic couplings, etc. can be used to couple the actuators 12 and/or 21 to the output load 14.

Figure 4:
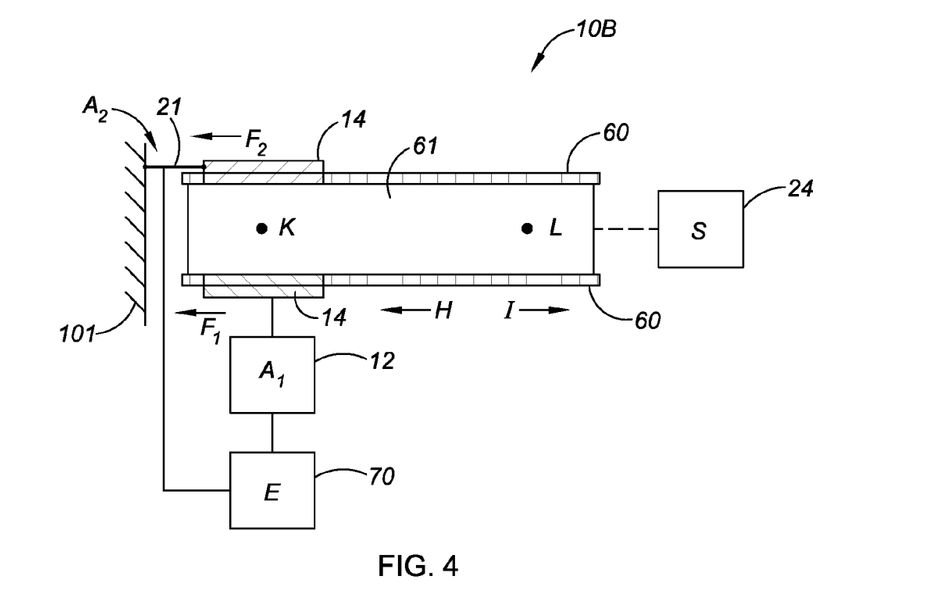
FIG. 4 is a schematic front view of a portion of an actuator configured as a linear actuator according to one embodiment of the invention.

Referring to FIG. 4, in another exemplary embodiment the actuators 12, 21 may also be used within an alternate mechanical system 10B having a stationary portion or body 61. The output load 14 is configured as a moveable portion or "shuttle car" that is repositionable along one or more tracks or rails 60 of the body 61 in the directions of arrows H and I. The output load 14 moves from a first position L to a second position K when at least one of the actuators 12, 21 are selectively activated or energized by the energy supply 70. A sensor 24 can be adapted for sensing or detecting the state of the system 10B, i.e., when the output load 14 has reached the second position K, the ambient temperature, the electrical power being supplied to the actuator 12, and/or 21, etc. For example, one or more sensors 24 may be configured as a limit switch or a proximity switch for signaling to the controller 19 (see FIG. 1) when the output load 14 has reached the second position K.

In this embodiment, the actuator 21 is connected to a stationary member 101 and to the output load 14. When energized or stimulated, the actuator 21 undergoes a phase change, or otherwise changes a variable property as described above, to exert the motive force $F_2$ on the output load 14, thus pulling the output load 14 in the direction of arrow H. When de-energized, a return force can either be provided by a spring (not shown) or by another actuator, such as the actuator 12, in order to return the output load 14 to its initial position L. Likewise, the actuator 12 when energized applies the motive force $F_1$ as needed in either direction (arrow H and I). For example, the actuator 12 can be configured as one or more interconnected gears, a motor, a chain and sprocket, or other suitable device for moving the output load 14. If so configured, a return spring (not shown) can be used to return the actuator 12 to its initial position. Additionally, the actuator 12 and 21 are coupled to the output load 14 in a manner that allows either of the actuators 12 or 21 to drive the other when only one of the actuators 12 or 21 is used to move the output load 14.

However configured, as will be now be described below with reference to FIG. 5, the controller 19 (see FIG. 1), and in particular the algorithm 100 resident therein, is adapted for determining which of the actuators 12 and/or 21 to activate as a primary actuator. The algorithm 100 does so by calculating or determining which combination of the actuators 12 and 21 is likely to be the more suitable actuator for accomplishing the movement of the output load 14 over the distance d under a given set of environmental and/or physical system conditions, and for selectively activating or energizing either or both of the actuators 12 and/or 21 in an optimal manner to move the output load 14.

Figure 5:
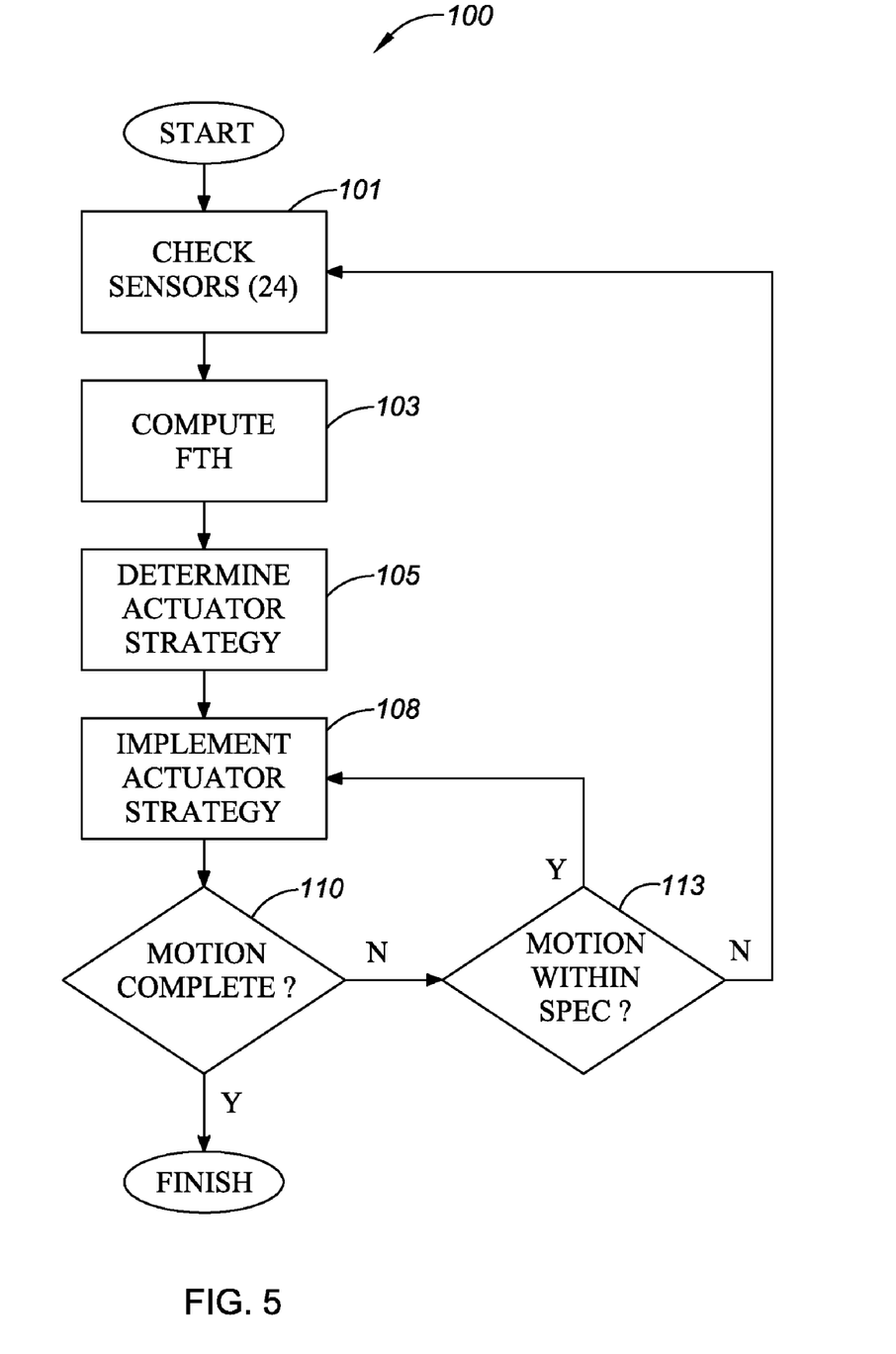
FIG. 5 is a flow chart describing a general control method for imparting a desired motion to an output load in the mechanical system shown in FIG. 1.

Referring to FIG. 5, a general method or algorithm 100 for controlling the system 10 of FIG. 1 and its various exemplary embodiments of FIGS. 2-4 through any manner of desired motion of the output load 14 begins at step 101, wherein the readings or collected data from the sensors 24 of FIG. 1 are checked. Sensor data in step 101 can include, but is not limited to, an actual position of the output load 14, a desired position of the output load 14, environmental readings or other data such as temperature, status and/or condition of the output load 14 of the system 10, etc. After checking all of the data collected by the sensors 24, the algorithm 100 proceeds to step 103.

At step 103, the algorithm 100 computes the required amount of motive force per unit time or the force-time history for whatever desired imparted motion of the output load 14 is commanded, such as a movement of the output load 14 over a predetermined distance within a threshold time, a desired acceleration of the output load 14, etc. After the force-time history is computed, the algorithm 100 proceeds to step 106.

At step 106, the algorithm 100 selects or chooses an actuator strategy, including the combination of actuators 12 and/or 21 which will be used to impart the desired motion to the output load 14. The strategy also includes the start/stop time for each of the actuators 12 and/or 21, the actuation levels provided by each of the actuators 12 and/or 21, the start/stop times for the actuators 12 and/or 21 through portions of the overall interval, and/or other factors which may be useful to determining an effective actuator strategy. The algorithm 100 then proceeds to step 108.

At step 108, the algorithm 100 implements or executes the actuator strategy determined at step 106 by energizing the combination of actuators 12 and/or 21 as need to comply with or follow the actuator strategy of step 106. The algorithm 100 then proceeds to step 110.

At step 110, the algorithm 100 determines whether the desired motion of the output load 14 is complete. If so, the algorithm 100 is finished. Otherwise, the algorithm 100 proceeds to step 113.

At step 113, having determined at step 110 that motion of the output load 14 is not yet complete, the algorithm 100 determines whether the ongoing motion is conforming to specifications or the actuator strategy within whatever tolerances are provided within that strategy, and/or within the system 10. If the motion is conforming, the algorithm 100 repeats step 108 and any required subsequent steps. Otherwise, the algorithm 100 returns to step 102 and repeats from the beginning, effectively re-evaluating the desired motion and the required actuator strategy and making any necessary adjustments.

Figure 6:
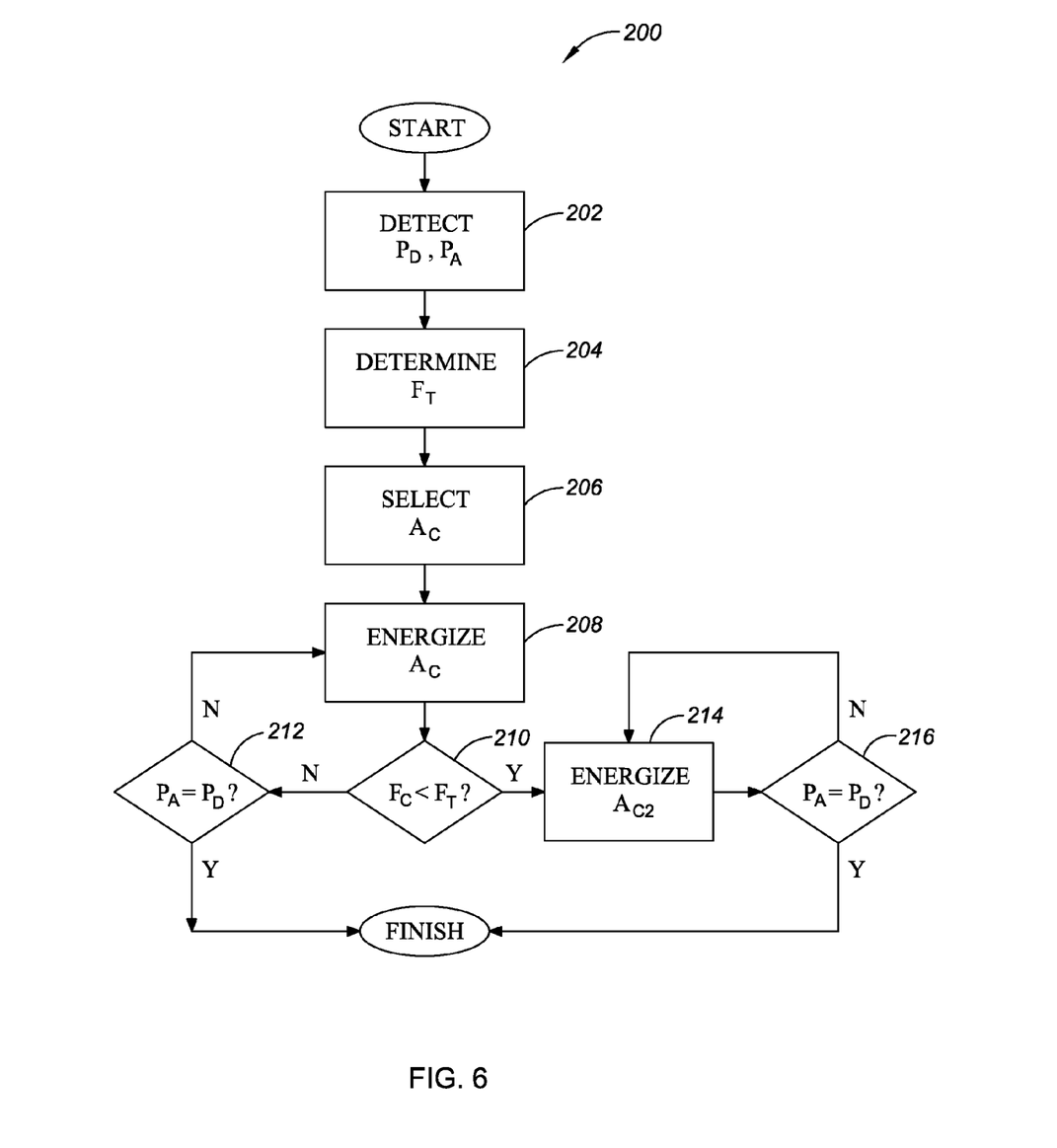
FIG. 6 is a flow chart describing one embodiment of the method for imparting a desired motion to an output load in the mechanical system shown in FIG. 1.

Referring to FIG. 6, a method or algorithm 200 is provided for controlling the system 10 of FIG. 1 and its various exemplary embodiments of FIGS. 2-4 through one example of a desired motion of the output load 14. The algorithm 200 begins at step 202, wherein signals or values are sensed, measured, or otherwise detected that represent both a present or actual position and a commanded or desired position of the output load 14, with the actual position abbreviated as $P_A$ and the desired position abbreviated as $P_D$ in FIG. 6. For example, in the embodiment shown in FIGS. 2 and 3, an operator of a vehicle (not shown) may signal a desire to impart a desired motion to the output load 14, for example from the actual position ($P_A$), such as the park (P) position of FIG. 2, to the desired position ($P_D$) such as the out-of-park (OP) position of FIG. 3. The sensor 24 (see FIG. 1) or multiple sensors 24 detects these signals and relays them to the controller 19 (see FIG. 1). The algorithm 200 then proceeds to step 204.

At step 204, the algorithm 200 calculates or determines the total motive force ($F_T$) as a function of time that is required for imparting the desired motion to the output load 14, e.g., to the desired position $P_D$ in the predetermined interval. This determination can be provided, for example, via a simple mass/distance calculation, and by compensating for any known quantities such as friction, temperature, etc., by accessing a lookup table, or using any other suitable means. The algorithm 200 then proceeds to step 206.

At step 206, the algorithm 200 determines which combination of the actuators 12 and 21 is the more suitable for producing the desired motion, and then actuates this combination of actuators, represented as $A_C$ in FIG. 6. The suitability determination can be made in a number of ways, for example by reviewing known operating parameters, capabilities, and/or limitations of each of the actuators 12 and 21, the desired distance through which the output load 14 is to be moved, the weight, mass, and/or inertial resistance of the output load 14 to an applied motive force, environmental conditions such as temperature, etc. The chosen or selected actuation strategy may require different combinations $A_C$ to be activated over different portions of the interval required for moving the output load 14. The algorithm 200 then proceeds to step 208.

At step 208, the algorithm 200 energizes the combination of actuators $A_C$ previously selected or determined at step 206, such as by connecting the actuator 12 and/or 21 to the energy source 70 (see FIG. 1) or another stimulus or energy source. The algorithm 200 then proceeds to step 210.

At step 210, the algorithm 200 compares the motive force $F_C$ exerted by the combination of actuators $A_C$ to the total motive force $F_T$ determined at step 204. If the motive force $F_C$ is less than the total motive force $F_T$, i.e., if the total force provided by the combination of actuators $A_C$ is insufficient for imparting the desired motion to the output load 14, the algorithm 200 repeats step 102 to reevaluate the situation and select another combination of actuators $A_C$. Otherwise, the algorithm 200 proceeds to step 212.

At step 112, the algorithm 200 determines whether the desired position ($P_D$) has been reached. If so, the algorithm is complete. Otherwise, the algorithm 200 repeats steps 208 and 210 until the output load 14 reaches the desired position ($P_D$).

At step 214, having determined at step 210 that the combined motive force $F_C$ is insufficient for moving the output load 14 to the desired position ($P_D$) within the desired interval, the algorithm 200 modifies the combination ($A_C$) to produce a revised combination of the actuators 12, 21, represented as the combination ($A_{C2}$) in FIG. 5. Once energized, the combination $A_{C2}$ provides the required total motive force needed to achieve the total motive force $F_T$ determined at step 204. The algorithm 200 then proceeds to step 216.

At step 216, the algorithm 200 determines whether the desired position ($P_D$) has been reached. If so, the algorithm 200 is complete. Otherwise, the algorithm 200 repeats steps 214 and 216 until the output load 14 reaches the desired position ($P_D$). As will be understood by those of ordinary skill in the art, and as discussed previously hereinabove, the combination $A_{C2}$ at step 214 is continuously variable to achieve the needed result, and does not represent a discrete value. That is, if the algorithm 200 determines at step 210 that the initial combination $A_C$ is insufficient, steps 214 and 216 can be repeated in a loop with different values for combination $A_{C2}$ being determined with each loop if needed.

While the best modes for carrying out the invention have been described in detail, those familiar with the art to which this invention relates will recognize various alternative designs and embodiments for practicing the invention within the scope of the appended claims.

The invention claimed is:

1. A system for selectively moving an output load over a predetermined distance, the system comprising:
   at least one energy source:
   a first actuator operable for applying a variable first motive force to move the output load:
   a second actuator operable for applying a variable second motive force to the output load to move the output load, wherein the second actuator includes an active element having a variable property, and wherein the second actuator is positioned in parallel with the first actuator with respect to the output load; and
   a controller operable for determining a total motive force sufficient for moving the output load, and for selectively varying a combination of the first and the second motive force to thereby apply the total motive force;
   wherein activating the second actuator includes connecting the active element of the second actuator to the at least one energy source to thereby apply a stimulus sufficient for varying the variable property.

2. The system of claim 1, wherein the controller is operable for determining an initial combination of the first and the second actuator that is most suitable for imparting the desired motion to the output load, and for selectively varying the combination as needed to thereby impart the desired motion to the output load.

3. The system of claim 2, further comprising a sensor adapted for detecting a condition of each of the first and the second actuator, and for transmitting the condition to the controller for determining which combination of the first and the second actuator is most suitable.

4. The system of claim 1, further comprising a sensor adapted for measuring at least one characteristic of the system, and for transmitting the at least one characteristic to the controller for determining the total motive force.

5. The system of claim 1, wherein the active element has a variable length as the variable property.

6. The system of claim 1, wherein the system is a transmission interlock system for a vehicle transmission, the stationary member is a member of the transmission that defines a notch, and the output load is a shaped locking member which is selectively engageable with the notch defined by the stationary member in response to the first and second motive forces to thereby provide a positive restraint against motion of the vehicle.

7. A system for selectively imparting a desired motion to an output load, the system comprising:
   a voltage supply;
   a first actuator operable for applying a variable first motive force sufficient for moving the output load over the predetermined distance;
   a second actuator operable for applying a variable second motive force sufficient for moving the output load over the predetermined distance, the second actuator including an active element having a variable property that varies in response to an electrical stimulus from the voltage supply, wherein the first actuator and the second actuator are positioned in parallel with each other with respect to the output load; and
   a controller operable for determining a suitable combination of the first and the second actuator for imparting the desired motion to the output load;
   wherein the controller is configured for activating the suitable combination when moving the output load over the predetermined distance to thereby impart the desired motion to the output load.

8. The system of claim 7, wherein activating the suitable combination includes activating the second actuator by varying the variable property.

9. The system of claim 7, wherein the active element is selected from the group consisting of a shaped-memory alloy (SMA), a magneto-strictive element, an electro-strictive element, a piezo-electric element, and an electro-active polymer (EAP).

10. The system of claim 9, wherein the active element is an SMA wire.

11. The system of claim 7, wherein the system is a transmission interlock system for a vehicle transmission, and the output load is a shaped locking member which is selectively engageable with a notch defined by a stationary member of the transmission in response to the first and second motive forces to thereby provide a positive restraint against motion of the vehicle.

12. A method for imparting a desired motion to an output load in a mechanical system a first actuator operable for applying a variable first motive force to the output load, and a second actuator operable for applying a variable second motive force to the output load, the method comprising:

connecting the first actuator to the output load;

connecting the second actuator between a stationary member of the system and the output load such that the second actuator is positioned in parallel with the first actuator with respect to the output load;

detecting a signal requesting the desired motion of the output load from a first position to a second position within a predetermined interval;

determining a total motive force necessary for moving the output load to the second position within the predetermined interval; and selectively actuating the first actuator to provide the first motive force as a portion of the total motive force; and selectively actuating an active element of the second actuator to thereby impart the second motive force as another portion of the total motive force;

wherein selectively actuating the active element includes applying a stimulus to the active element to thereby vary a variable property of the active element.

13. The method of claim 12, wherein applying a stimulus to the active element to thereby vary the variable property includes applying an electrical stimulus to vary a variable length of the active element.

14. The method of claim 12, wherein a portion of the output load is configured as a locking member for a vehicle transmission, the method further comprising:

moving the output load to the first position to place the vehicle transmission in a park (P) position; and moving the output load to the second position to place the transmission in an out-of-park (OP) position.

15. The method of claim 12, wherein the output load is configured as a moveable portion of a linear actuator.

* * * * *